(12) United States Patent
Liu et al.

(10) Patent No.: US 11,780,776 B2
(45) Date of Patent: Oct. 10, 2023

(54) HIGH-STRENGTH GLASS-CERAMIC-BASED LIGHTWEIGHT AGGREGATES AND PREPARATION METHOD THEREOF

(71) Applicant: Wuhan University of Technology, Wuhan (CN)

(72) Inventors: Yunpeng Liu, Wuhan (CN); Wenhao Wan, Wuhan (CN); Fazhou Wang, Wuhan (CN); Shuguang Hu, Wuhan (CN)

(73) Assignee: WUHAN UNIVERSITY OF TECHNOLOGY, Wuhan (CN)

( * ) Notice: Subject to any disclaimer, the term of this patent is extended or adjusted under 35 U.S.C. 154(b) by 0 days.

(21) Appl. No.: 18/097,346

(22) Filed: Jan. 16, 2023

(65) Prior Publication Data
US 2023/0234886 A1 Jul. 27, 2023

(30) Foreign Application Priority Data
Jan. 21, 2022 (CN) .......................... 202210072395.0

(51) Int. Cl.
*C03B 1/00* (2006.01)
*C03B 19/06* (2006.01)
(Continued)

(52) U.S. Cl.
CPC ............ *C04B 33/132* (2013.01); *C04B 14/22* (2013.01); *C04B 18/023* (2013.01);
(Continued)

(58) Field of Classification Search
CPC ..... C04B 33/132; C04B 14/22; C04B 18/023; C04B 18/027; C04B 33/13; C04B 33/131; C04B 38/009; C04B 2111/40; C04B 2235/3208; C04B 2235/3232; C04B 2235/3241; C04B 2235/442; C04B 2235/445; C04B 14/24; C04B 14/26; C04B 14/28; C04B 14/304; C04B 14/305;
(Continued)

(56) References Cited

FOREIGN PATENT DOCUMENTS

| CN | 108424016 A | * | 8/2018 | ........... C04B 18/023 |
| CN | 112552072 A | * | 3/2021 | |

OTHER PUBLICATIONS

CN-112552072-A, machine translation (Year: 2021).*
CN-108424016-A, machine translation (Year: 2018).*

* cited by examiner

*Primary Examiner* — Kevin E Yoon
*Assistant Examiner* — Marites A Guino-O Uzzle
(74) *Attorney, Agent, or Firm* — WPAT, P.C

(57) ABSTRACT

The invention discloses high-strength glass-ceramic-based lightweight aggregates and the preparation method thereof. The mass ratio of raw material components is 50-70 parts of engineering muck, 20-40 parts of glass, 3-7 parts of calcium carbonate, 3-7 parts of magnesium oxide, and 2-10 parts of a nucleating agent; the nucleating agent is at least one of calcium fluoride, titanium dioxide, and chromium oxide. After crushing, mixing, and granulating, spherical particles with a particle size of 10-12 mm are formed; and then the product can be obtained after drying, sintering, and cooling. The obtained lightweight aggregate from the invention has a diopside matrix which provides high strength and a low water absorption rate at low densities. Moreover, waste glass and engineering muck could be utilized with high value.

5 Claims, 3 Drawing Sheets

(51) Int. Cl.
- *C03C 1/00* (2006.01)
- *C03C 10/16* (2006.01)
- *C04B 14/22* (2006.01)
- *C04B 18/02* (2006.01)
- *C04B 33/132* (2006.01)
- *C04B 33/13* (2006.01)
- C04B 111/40 (2006.01)
- C03C 10/00 (2006.01)
- C04B 38/00 (2006.01)

(52) U.S. Cl.
CPC ............ *C04B 18/027* (2013.01); *C04B 33/13* (2013.01); *C04B 33/131* (2013.01); *C03B 1/00* (2013.01); *C03B 19/063* (2013.01); *C03C 1/002* (2013.01); *C03C 10/0063* (2013.01); *C03C 10/16* (2013.01); *C03C 2204/00* (2013.01); *C04B 38/009* (2013.01); *C04B 2111/40* (2013.01); *C04B 2235/3208* (2013.01); *C04B 2235/3232* (2013.01); *C04B 2235/3241* (2013.01); *C04B 2235/442* (2013.01); *C04B 2235/445* (2013.01); *Y02P 40/60* (2015.11)

(58) Field of Classification Search
CPC ....... C04B 14/307; C04B 18/02; C04B 38/00; C04B 2235/32; C04B 2235/3205; C04B 2235/44; C04B 2235/444; C03B 1/00; C03B 19/063; C03C 1/002; C03C 10/0063; C03C 10/16; C03C 2204/00; Y02P 40/60

See application file for complete search history.

HIGH-STRENGTH GLASS-CERAMIC-BASED LIGHTWEIGHT AGGREGATES AND PREPARATION METHOD THEREOF

FIELD OF THE DISCLOSURE

The disclosure relates to a preparation method of high-strength glass-ceramic-based lightweight aggregates that can be used as building materials.

BACKGROUND

To reduce energy consumption and carbon emission, solid waste disposal in the rotary kiln (at maximum temperatures of 1000° C.-1300° C.) when producing lightweight aggregates (LWAs) has attracted wide attention. At present, the primary raw materials for lightweight aggregates production are solid wastes such as fly ash, sludge, industrial tailings, and engineering muck rather than traditional natural resources such as clay and shale.

Engineering muck is a typical solid waste produced in large-scale urban construction projects, especially in large-scale and underground engineering. Currently, marginal muck is fed back into recycling, with the majority ending at landfills. However, because its composition is similar to natural clay, it could be used to manufacture LWAs. The prepared LWAs could be used for lightweight concrete that meets the needs of high-rise buildings and large-span bridges. Moreover, this method improves the utilization rate of engineering muck, which reduces land occupation and environmental pollution.

On the other hand, a large amount of waste glass is generated during the production and use of glass. The content of $Na_2O$ and $K_2O$ in glass is high. Adding glass to the raw materials for LWAs can reduce the formation temperature and viscosity of the liquid phase, thus reducing energy consumption and promoting the expansion of LWAs. Moreover, glass is completely amorphous and can potentially reform the microcrystalline phase during the sintering process, significantly improving the strength of LWAs. However, this is usually neglected in the production of LWAs.

Chinese invention patent CN101215149A discloses a preparation method for calcinating sludge and waste glass to prepare ultra-light weight aggregates at low temperatures. The raw material compositions are as follows: 20-70 wt. % sludge, 25-75 wt. % waste glass powder, and 2-6 wt. % supplemental raw materials. However, the waste glass is only used as a fluxing component to reduce the calcination temperatures. Though the prepared LWAs had a low bulk density (400 g/cm$^3$), their crushing strength was low (only about 1 MPa), and the water absorption rate was high (more than 6%).

Chinese invention patent CN101215150A discloses a preparation method for sintering LWAs from solid waste. The raw material compositions are as follows: 15-45 wt. % gangue, 25-50 wt. % dry sludge, and 20-50 wt. % waste glass. The above raw materials are subject to low-temperature heat preservation, sintering heat preservation, and three stages of cooling annealing treatment to obtain LWAs. The sintering process is relatively complex, which is not conducive to industrial production. The bulk density of the obtained LWAs is about 500 kg/m$^3$, and the crushing strength is less than 5 MPa.

Chinese invention patent CN101538131 discloses a method to sinter LWAs by using Bayer red mud as the primary raw material. The raw material compositions are as follows: 50-60 wt. % Bayer red mud, 20-25 wt. % fly ash, 15-20 wt. % waste glass, 2 wt. % starch, 2 wt. % carbon powder, and 1 wt. % sodium hexametaphosphate. The LWAs are obtained after high-temperature sintering and forced cooling. The vitrification degree of the outer surface of LWAs is good, and its inner pores are mainly closed pores. Therefore, the water absorption rate of LWAs is less than 1%. However, rapid cooling is not conducive to forming crystals. When the bulk density is 780 kg/cm$^3$, the crushing strength is only 4.6 MPa.

In summary, the current problems of using solid waste and waste glass to produce LWAs are as follows:

1. It is difficult to further improve the crushing strength of LWAs at low densities according to the present design method.

2. The prepared LWAs usually have a high water absorption rate, which could not meet the pumping requirements of lightweight concretes for high-rise buildings.

3. The incorporation of waste glass in raw materials mainly reduces the calcination temperature and liquid viscosity by its high $R_2O$ content, thus reducing energy consumption and promoting the expansion of LWAs. However, the potential of amorphous structure in glass to form high-strength crystals is neglected.

In brief, a new method is needed to prepare high-strength LWAs with low water absorption.

SUMMARY

This disclosure proposed a preparation method of high-strength LWAs with a glass-ceramic phase as the matrix. The prepared LWAs showed a significant increase in crushing strength and a reduction in water absorption rate. The mix proportions are designed according to the chemical compositions of diopside microcrystalline ($SiO_2$ 45-60 wt. %, CaO 5-20 wt. %, and MgO 5-20 wt. %). Moreover, a nucleating agent is added to promote the formation and growth of microcrystalline. Finally, the lightweight high-strength LWAs with glass-ceramic phase are prepared with a proper calcination regime.

The purpose of the invention is realized through the following technical solutions:

In the first aspect, the present invention provides the mix proportions of high-strength glass-ceramic-based lightweight aggregates containing the following components in parts by mass: 50-70 parts of engineering muck, 20-40 parts of waste glass, 3-7 parts of calcium carbonate, 3-7 parts of magnesium oxide and 2-10 parts of a nucleating agent. The nucleating agent is at least one of calcium fluoride, titanium dioxide, and chromium oxide.

Preferably, the high-strength glass-ceramic-based lightweight aggregates include the following components in parts by mass: 50-70 parts of engineering muck, 20-40 parts of waste glass, 5 parts of calcium carbonate, 5 parts of magnesium oxide, and 2-10 parts of a nucleating agent. The nucleating agent is at least one of calcium fluoride, titanium dioxide, and chromium oxide.

Preferably, the engineering muck is brown muck produced in underground engineering development, which is crushed before use and then dried at 105° C. for 48 h.

Preferably, the calcium carbonate and magnesium oxide are analytically pure.

Preferably, the waste glass is waste colorless transparent flat glass.

In the second aspect, the invention provides a preparation method for the high-strength glass-ceramic-based lightweight aggregates, comprising the following steps:

(1) Separately crushing, ball milling, and sieving the engineering muck, waste glass, calcium carbonate, magnesium oxide, and a nucleating agent to obtain the powder of the above components;

(2) Mixing the powder in step (1) with water to obtain the mixture, and then successively granulating, drying, and sintering the mixture to obtain the high-strength glass-ceramic-based lightweight aggregate.

Preferably, the amount of water added in step (2) accounts for 30-40% of the total mass of the powder.

Preferably, the process of granulating in step (2) is as follows: preparing spherical pellets with a particle size of 10-12 mm by a granulator.

Preferably, the drying temperature is 105° C., and the drying time is 2-4 h in step (2).

Preferably, the sintering steps are as follows:

The first heating stage raises the temperature from room temperature to 800° C. at a heating rate of 5-10° C./min;

A nucleation stage is to maintain at 800° C. for 30-60 min;

The second heating stage raises the temperature from 800° C. to 1100-1180° C. at a heating rate of 10° C./min;

A sintering stage is maintained at 1120-1180° C. for 1 h and then cooled down to room temperature with the kiln.

The high-strength glass-ceramic-based lightweight aggregates are used to prepare building materials.

Glass-ceramic consists of a large amount of microcrystalline by crystallizing glass (amorphous) during the heating process. It has excellent properties superior to glass and ceramics, such as high strength, low water absorption, good chemical stability, and thermal stability. Glass has been used as the raw materials for LWAs to reduce the calcination temperature and viscosity of the liquid phase due to its high flux content. However, the use of the amorphous phase in glass to prepare glass-ceramic-based LWAs is rarely studied. The invention designed the mix proportions according to the composition of diopside microcrystalline. The glass-ceramic-based LWAs were prepared with waste glass and engineering muck as the primary raw materials. This invention provides a new way to improve the strength and reduce the water absorption of LWAs.

The advantages of the technical scheme proposed in the disclosure are:

The invention provides a method for sintering high-strength LWAs by using waste glass and building residue, which is low-cost, simple, and convenient for large-scale industrial production. The invention uses the amorphous property of waste glass to generate a microcrystalline phase in LWAs, which increases strength while decreasing the water absorption rate. Moreover, due to the good cohesiveness of the engineering muck, it can bond the glass powder well without additional bonding components. The prepared LWAs can be widely used in lightweight aggregate concrete for high-rise buildings and long-span bridges.

BRIEF DESCRIPTION OF THE DRAWINGS

Accompanying drawings provide a further understanding of embodiments of the disclosure. The drawings form a part of the disclosure and illustrate the principle of the embodiments of the disclosure along with the literal description. Apparently, the drawings in the description below are merely some embodiments of the disclosure. A person skilled in art can obtain other drawings according to these drawings without creative efforts. In the figures.

DETAILED DESCRIPTION OF PREFERRED EMBODIMENTS

Figure 1:
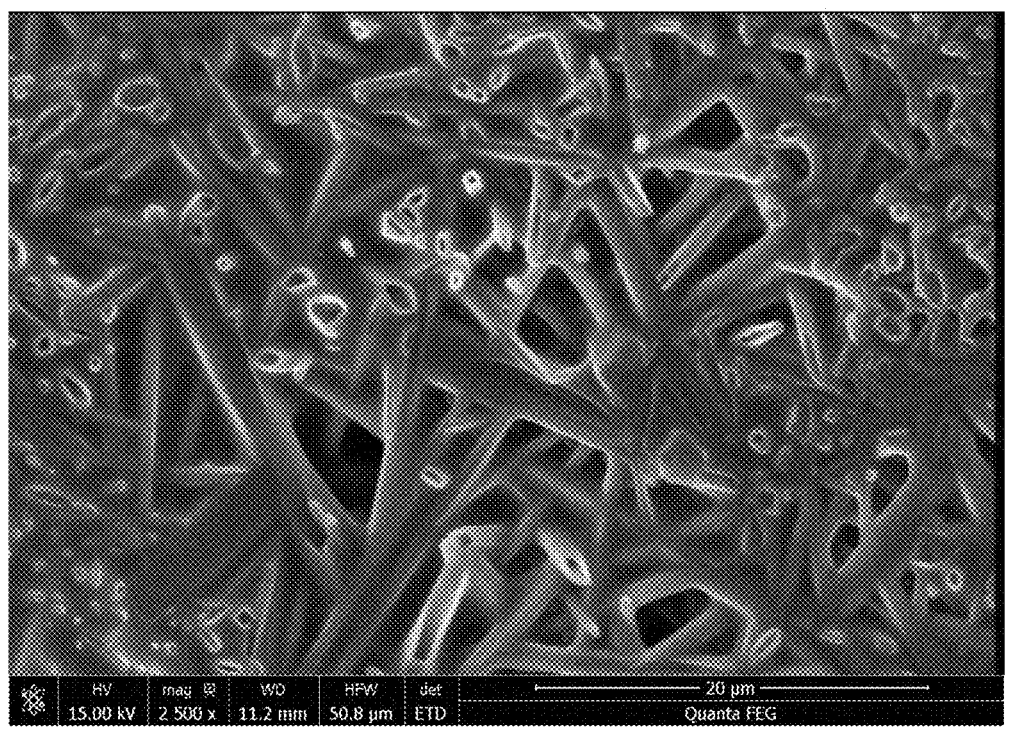
FIG. 1 is an internal micrograph of the high-strength glass-ceramic-based lightweight aggregate prepared in Example 1.

The invention will be further described in detail in combination with embodiments to make the purpose, technical scheme, and advantages of the invention clear. The specific embodiments described herein are only used to explain the invention and are not intended to limit the invention.

Example 1

This embodiment provides a method for preparing a high-strength glass-ceramic-based lightweight aggregate, including the following steps:

(1) Preparation of raw materials: firstly, the engineering muck is crushed and put into a drier for drying at 105° C. for 48 h. Then, the components of the waste glass (transparent plate glass), engineering muck, analytically pure calcium carbonate, analytically pure magnesium oxide, and calcium fluoride are crushed and ball-milled, respectively. The powder with a sieve residue of less than 5% is obtained through a 200 mesh sieve. Then weigh the above powder according to the mix proportion. Specifically, the mass ratio of the waste glass, engineering muck, analytical pure calcium carbonate, analytical pure magnesium oxide, and calcium fluoride is 50:40:5:5:2.

(2) Raw material mixing, raw spherical pellets preparing, and drying: putting all powder raw materials into the blender and mix for 4 hours at 120 r/min to get the mixture; Then, add 30-40% water of the mixture, and the pellets with a diameter of 10-12 mm are formed by a granulator. Put the pellets into an oven and dry them for 4 h at 105° C. to obtain dry raw spherical pellets.

(3) Sintering of LWAs: putting the raw spherical pellets into a muffle furnace, and the sintering regime are as follows: raising the temperature from room temperature to 800° C. at a heating rate of 5° C./min and maintaining at 800° C. for 1 h; then raising the temperature from 800° C. to 1150° C. at a heating rate of 10° C./min, and maintaining at 1150° C. for 1 h; then naturally cooling to room temperature to get the product.

The apparent density of the LWAs prepared in Example 1 is 1110 kg/m$^3$ (the bulk density is about 600 kg/m$^3$), the 24 h water absorption rate is 0.389%, and the single particle crushing strength is 14.01 MPa. The experimental data is obtained from 10 LWAs with similar sizes and regular shapes, and their average strength is calculated.

Example 2

This embodiment provides a method for preparing high-strength glass-ceramic-based LWAs, including the following steps:

(1) Preparation of raw materials: firstly, the engineering muck is crushed and put into a drier for drying at 105° C. for 48 h. Then, the components of the waste glass (transparent plate glass), engineering muck, analytically pure calcium carbonate, analytically pure magnesium oxide, and calcium fluoride are crushed and ball-milled, respectively. The powder with a sieve residue of less than 5% is obtained through a 200 mesh sieve. Then weigh the above powder according to the mass ratio. Specifically, the mass ratio of the waste glass, building residue, analytical pure calcium carbonate, analytical pure magnesium oxide, and calcium fluoride is 50:40:5:5:2.

(2) Raw material mixing, raw spherical pellets preparing, and drying: putting all powder raw materials into the blender and mix for 4 hours at 120 r/min to get the mixture; Then, add 30-40% water of the mixture, and the pellets with a diameter of 10-12 mm are formed by a granulator. Put the pellets into an oven and dry them for 4 h at 105° C. to obtain dry raw spherical pellets.

(3) Sintering of LWAs: putting the raw spherical pellets into a muffle furnace, and the sintering regime are as follows: raising the temperature from room temperature to 800° C. at a heating rate of 5° C./min and maintaining at 800° C. for 1 h; then raising the temperature from 800° C. to 1180° C. at a heating rate of 10° C./min, and maintaining at 1180° C. for 1 h; then naturally cooling to room temperature to get the product.

The apparent density of the product prepared in Example 2 is 930 kg/m$^3$ (the bulk density is about 500 kg/m$^3$), the 24 h water absorption rate is 2.224%, and the single particle crushing strength is 10.07 MPa. The experimental data is obtained from 10 LWAs with similar sizes and regular shapes, and their average strength is calculated.

At 1180° C., the liquid viscosity of LWAs is lower. Therefore, a part of the gas will overflow the surface of LWAs during the expansion process, which forms connected pores in the inner matrix of LWAs, and the surface of LWAs will also form pores. This is the reason why the water absorption of LWAs increases. At the same time, the porous surface and low density reduced the strength.

Example 3

This embodiment provides a method for preparing high-strength glass-ceramic-based LWAs, including the following steps:

(1) Preparation of raw materials: firstly, the engineering muck is crushed and put into a drier for drying at 105° C. for 48 h. Then, the components of the waste glass (transparent plate glass), engineering muck, analytically pure calcium carbonate, analytically pure magnesium oxide, and calcium fluoride are crushed and ball-milled, respectively. The powder with a sieve residue of less than 5% is obtained through a 200 mesh sieve. Then weigh the above powder according to the mass ratio. Specifically, the mass ratio of the waste glass, engineering muck, analytical pure calcium carbonate, analytical pure magnesium oxide, and calcium fluoride is 70:20:5:5:2.

(2) Raw material mixing, raw spherical pellets forming and drying: putting raw materials into the blender and mixing for 4 hours at 120 r/min to get the mixture; Then, add 30-40% water of the mixture and the pellets with a diameter of 10-12 mm are formed by a granulator. Put the pellets into an oven and dry them for 4 h at 105° C. to obtain dry raw spherical pellets.

(3) Sintering of LWAs: putting the raw spherical pellets into a muffle furnace, and the sintering conditions are as follows: raising the temperature from room temperature to 800° C. at a heating rate of 5° C./min and maintaining at 800° C. for 1 h; then raising the temperature from 800° C. to 1120° C. at a heating rate of 10° C./min, and maintaining at 1120° C. for 1 h; then naturally cooling to room temperature to get the product.

The apparent density of the product prepared in Example 3 is 1090 kg/m$^3$ (the bulk density is about 600 kg/m$^3$), the 24 h water absorption rate is 0.479%, and the single particle crushing strength is 13.93 MPa. The experimental data is obtained from 10 LWAs with similar sizes and regular shapes, and their average strength is calculated.

FIG. 1 is an internal micrograph of the high-strength glass-ceramic-based lightweight aggregates prepared in Example 1. Microcrystalline phases (long columnar shape) are intertwined, which differs from the microscopic morphology of conventional LWAs. The three-dimensional network structure is composed of microcrystalline phases that significantly improve the strength of LWAs.

Figure 2:
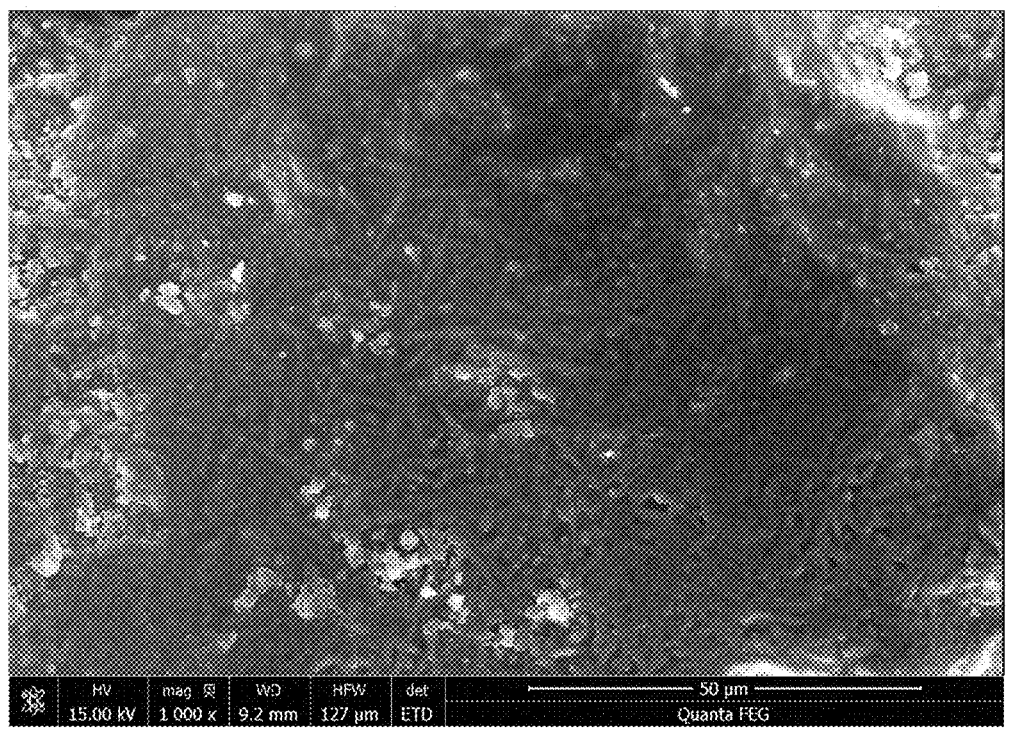
FIG. 2 is an external micrograph of the high-strength glass-ceramic-based lightweight aggregate in Example 1.
Figure 3:
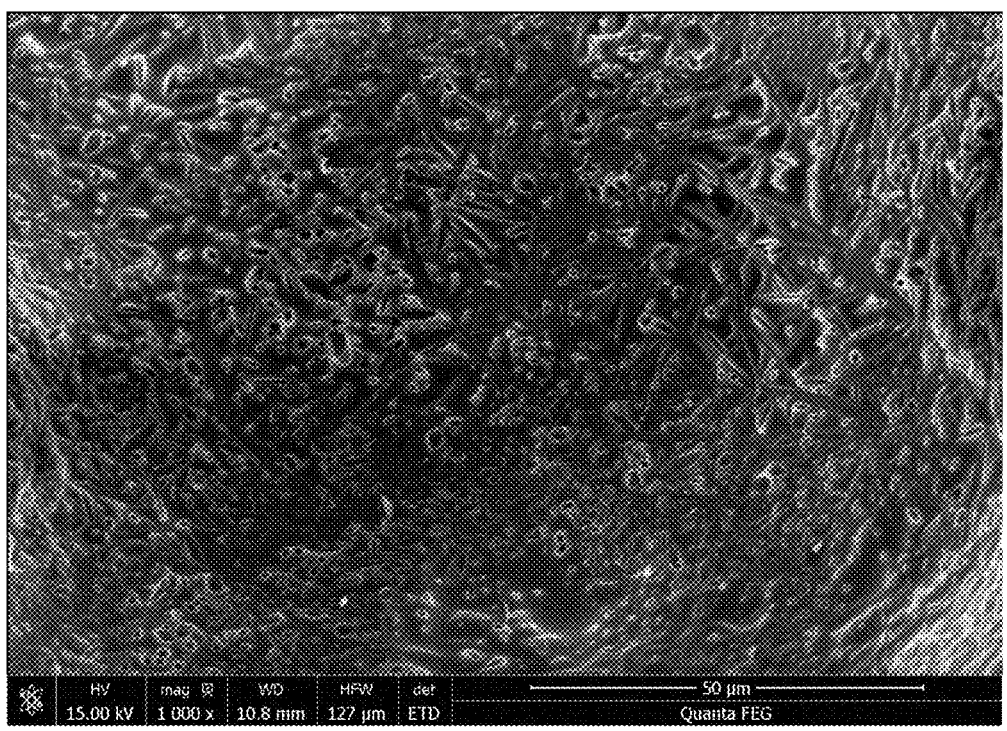
FIG. 3 is an internal micrograph of the high-strength glass-ceramic-based lightweight aggregate prepared in Example 2.
Figure 4:
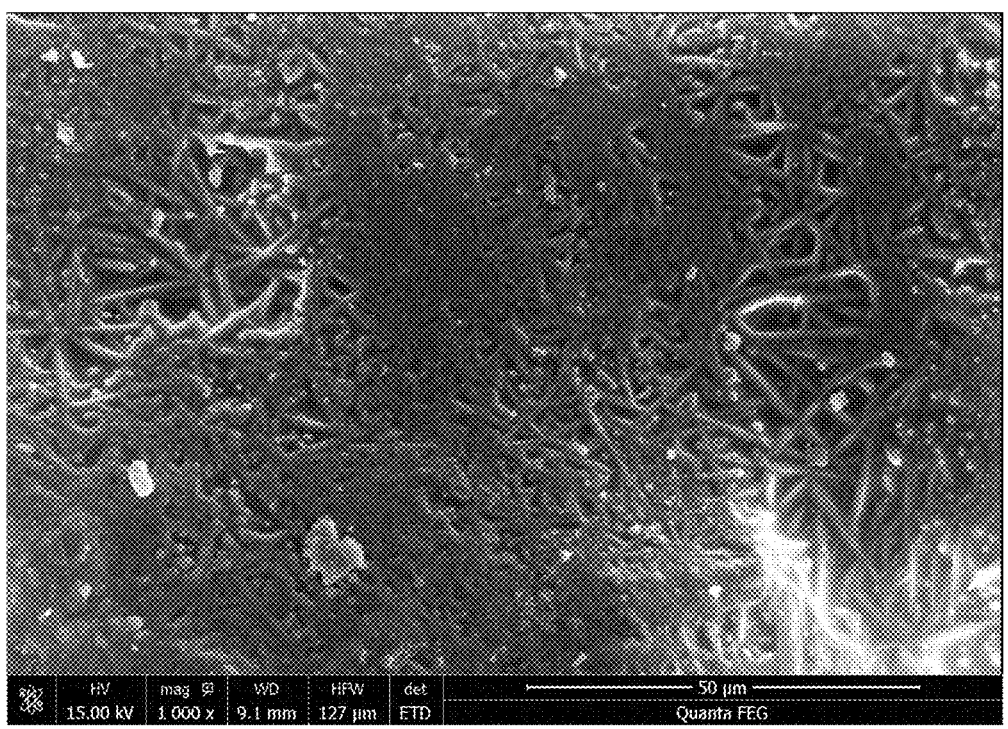
FIG. 4 is an external micrograph of the high-strength glass-ceramic-based lightweight aggregate prepared in Example 2.
Figure 5:
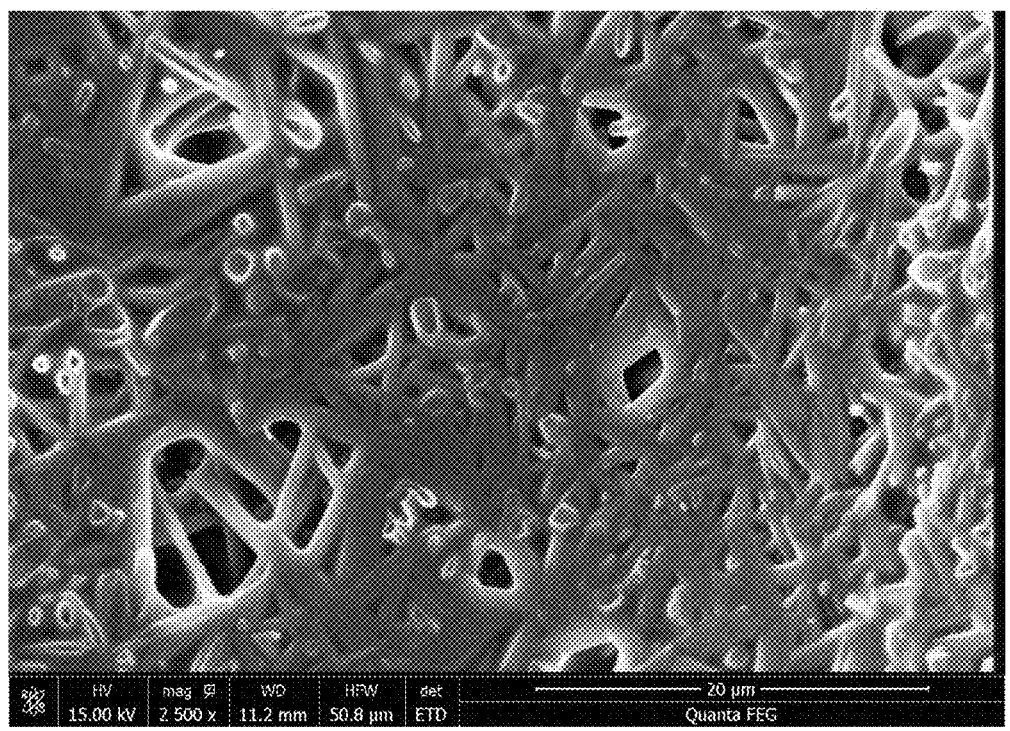
FIG. 5 is an internal micrograph of the high-strength glass-ceramic-based lightweight aggregate in Example 3.
Figure 6:
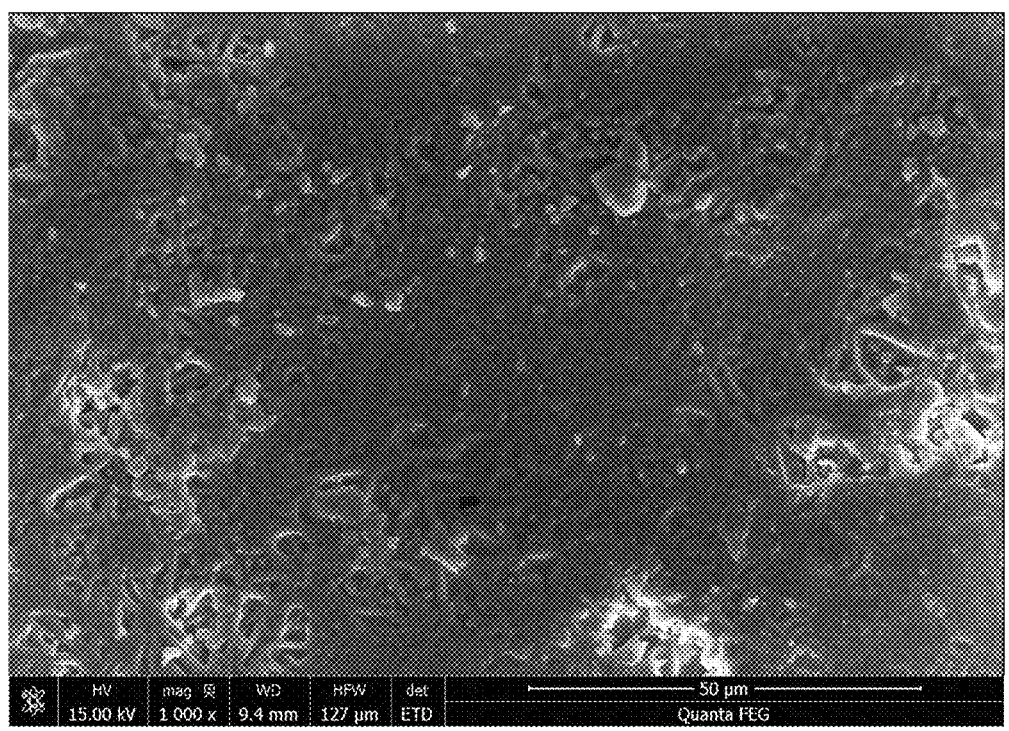
FIG. 6 is an external micrograph of the high-strength glass-ceramic-based lightweight aggregate in Example 3.

FIG. 2 is an external micrograph of the high-strength glass-ceramic-based LWAs prepared in Example 1. Although there are microcrystalline phases on the surface of LWAs, the distribution density is less than that inside. The surface is still dominated by the dense glass phase, which is conducive to reducing the water absorption of LWAs.

The LWAs prepared in Examples 2-3 have an external and internal structure similar to that in Example 1, as shown in FIGS. 3-6.

The above descriptions are only preferred embodiments of the present invention and are not intended to limit the present invention. Any modification, equivalent replacement, improvement, etc., made within the spirit and principle of the present invention shall be included in the protection of the present invention.

What is claimed is:

1. High-strength glass-ceramic-based lightweight aggregates, containing the following components in parts by mass:
50-70 parts of engineering muck, 20-40 parts of waste glass, 3-7 parts of calcium carbonate, 3-7 parts of magnesium oxide, and 2-10 parts of a nucleating agent; the nucleating agent is at least one of calcium fluoride, titanium dioxide, and chromium oxide;
the sintering steps of the high-strength glass-ceramic-based lightweight aggregates are as follows:
a first heating stage that raises the temperature from room temperature to 800° C. at a heating rate of 5-10° C./min;
a nucleation phase that is maintained at 800° C. for 30-60 min;
a second heating stage that raises the temperature from 800° C. to 1100-1180° C. at a heating rate of 10° C./min;
a sintering phase that maintains at 1120-1180° C. for 1 h and then cools down to room temperature.

2. The high-strength glass-ceramic-based lightweight aggregates according to claim 1, containing the following components in parts by mass: 50-70 parts of engineering muck, 20-40 parts of waste glass, 5 parts of calcium carbonate, 5 parts of magnesium oxide and 2-10 parts of a nucleating agent; the nucleating agent is at least one of calcium fluoride, titanium dioxide, and chromium oxide.

3. The high-strength glass-ceramic-based lightweight aggregates according to claim 2, wherein the engineering muck is brown muck produced in underground engineering development, which is crushed before use and then dried at 105° C. for 48 h.

4. The high-strength glass-ceramic-based lightweight aggregates according to claim 2, wherein the calcium carbonate and magnesium oxide are analytically pure; the waste glass is waste colorless transparent flat glass.

5. The high-strength glass-ceramic-based lightweight aggregates according to claim 1 are used to prepare building materials.

* * * * *